United States Patent [19]

Veronesi et al.

[11] Patent Number: 5,713,727
[45] Date of Patent: *Feb. 3, 1998

[54] MULTI-STAGE PUMP POWERED BY INTEGRAL CANNED MOTORS

[75] Inventors: Luciano Veronesi, Pittsburgh; Allen L. Morris, Allison Park, both of Pa.

[73] Assignee: Westinghouse Electric Corporation, Pittsburgh, Pa.

[*] Notice: The term of this patent shall not extend beyond the expiration date of Pat. No. 5,490,768.

[21] Appl. No.: 383,345

[22] Filed: Feb. 3, 1995

Related U.S. Application Data

[63] Continuation-in-part of Ser. No. 164,892, Dec. 9, 1993, Pat. No. 5,490,768.

[51] Int. Cl.$^6$ ............................................. F04B 35/04
[52] U.S. Cl. ........................ 417/356; 417/357; 417/366; 417/423.5; 417/423.8; 440/30
[58] Field of Search .................... 417/423.5, 423.8, 417/244, 356, 357, 366, 423.12; 440/30

[56] References Cited

U.S. PATENT DOCUMENTS

| | | |
|---|---|---|
| 1,071,042 | 8/1913 | Fuller. |
| 2,537,310 | 1/1951 | Lapp ........................ 417/356 |
| 2,839,005 | 6/1958 | Means. |
| 3,276,382 | 10/1966 | Richter. |
| 3,723,028 | 3/1973 | Bottoms et al. ............. 417/356 |
| 4,050,849 | 9/1977 | Sheets. |
| 4,190,395 | 2/1980 | Ball. |
| 4,341,173 | 7/1982 | Hagelberg et al. |
| 4,474,561 | 10/1984 | Haglund. |
| 4,541,782 | 9/1985 | Mohn ......................... 417/367 |
| 4,643,685 | 2/1987 | Nishida. |
| 4,678,400 | 7/1987 | Kuboyama ................ 415/199.4 |
| 4,718,870 | 1/1988 | Watts. |
| 4,917,637 | 4/1990 | Soga et al. |
| 5,101,128 | 3/1992 | Veronesi et al. |
| 5,165,864 | 11/1992 | Burger et al. ............... 417/244 |
| 5,209,650 | 5/1993 | Lemieux ................... 417/423.5 |
| 5,490,768 | 2/1996 | Veronesi et al. ............ 417/356 |
| 5,494,413 | 2/1996 | Campen et al. ............ 417/423.8 |

*Primary Examiner*—Charles G. Freay

[57] ABSTRACT

An in-line, multi-stage pump powered by integral canned electric motors. At least two pump units are connected in series in a pipeline. Each of said pump units includes a hollow housing having a hermetically sealed stator mounted therein. The stator is electrically connected to a source of electrical energy. An impeller assembly that includes a tubular suction shroud and impeller is rotatably mounted inside the housing. The impeller assembly includes a hermetically sealed rotor which is mounted around the suction shroud and positioned inside the stator in operative association therewith. Energizing the stator rotates the rotor, which in turn rotates the impeller to pump fluid from the intake end of the housing to the outlet end of the housing. The subsequent pump units add pressure and/or maintains the pressure of the pumped fluid.

11 Claims, 2 Drawing Sheets

1

MULTI-STAGE PUMP POWERED BY INTEGRAL CANNED MOTORS

This application is a continuation-in-part of U.S. patent application Ser. No. 08/164,892, filed Dec. 9, 1993, now U.S Pat. No. 5,490,768.

BACKGROUND OF THE INVENTION

1. Field of the Invention

This invention relates to multi-stage in-line pumps and, more particularly, to such pumps powered by integral canned electric motors.

2. Description of the Prior Art

Pumps are commonly used to move fluids through pipelines. One such application is the main seawater pump of a ship or other marine vessel. The main seawater pump provides cooling water flow to the secondary side of the steam turbine condenser system. The performance of the seawater pump and its reliability is vital to the safe and continuous operation of the vessel.

In modern warships, such as submarines, quiet operation is of the utmost importance. The main seawater pump is one of the most difficult pieces of machinery to silence. Noise emanating from the main seawater pump is coupled directly to the sea through the fluid that is being pumped. Because of that, isolation techniques are less effective and the pump must be intrinsically quiet.

Modern powerful propulsion plants require larger main seawater pumps which have increased noise potential. Speed of the impeller blade tips increases with both diameter and rotational speed. Broad band noise is estimated to increase as the sixth power of impeller blade tip speed. As the pump capacity and head increase, hydrodynamic loading of the impeller increases in order to keep size to a minimum. Greater increased hydrodynamic loading can result in greater susceptibility to cavitation which results in the pump operating more noisily.

In addition, because conventional main seawater pumps are typically driven by an external motor, the drive shaft connecting the motor and the impeller must penetrate the pipe wall. Mechanical seals at the interface are often highly complex and are the source of maintenance problems.

Efforts to silence conventional main seawater pumps have led to even further increases in size. One conventional design uses an involute casing in order to direct fluid flow for acoustical advantage. The resulting casing must be more than twice as large as an equivalent conventional casing.

Main seawater pumps typically become quieter when run at slower speeds. Adjustable speed pumps, which can be operated at different speeds depending on performance which is needed based on the operating conditions of the power plant, are desirable.

There is a need for a main seawater pump which can operate at lower speeds to reduce the noise generated by impeller cavitation while maintaining the desired level of performance. There also remains a need for a main seawater pump that can be operated at slower speeds to decrease the mechanical noise created by operation of the motor and pumps.

SUMMARY OF THE INVENTION

This invention provides an in-line, multi-stage pump utilizing canned electric motor technology. One application for such a pump is for main seawater pumps for marine vessels. Such pumps provide cooling water flow to the secondary side of steam turbine condensers. The pump includes at least two pump units connected in series in a flow path, such as an enclosed pipe line. Each pump unit includes a generally hollow housing secured into the flow path. The housing includes an inlet end and an outlet end. An annular stator is mounted inside the housing. Electrical power is supplied to the stator from an external power source such as a generator. An impeller assembly is rotatably mounted in the hollow portion of the housing. The impeller assembly includes a tubular suction shroud extending through and rotatable relative to the annular stator. An impeller is secured to the tubular suction shroud. An annular rotor is mounted around the suction shroud and positioned inside the annular stator to form an electric motor. When the stator is energized, the rotor rotates, thereby rotating the tubular suction shroud and impeller to create a pressurized flow of water through the housing from the inlet end to the outlet end.

The tubular suction shroud preferably has a forward end and an aft end. The forward end is positioned to form a forward gap relative to the housing and the aft end is positioned to form an aft gap relative to the housing. The forward gap and the aft gap are in communication with one another forming a water circulation channel between the rotor and the housing. The forward gap is preferably on the inlet side of the impeller and the aft gap is preferably on the outlet side of the impeller. When the impeller is rotating, water pressure will be higher at the outlet end than at the inlet end of the housing. Water will flow from the higher pressure area at the aft gap to the lower pressure area at the forward gap to cool the motor.

At least one water cooled, hard surface bearing is preferably mounted on the housing and the impeller assembly and is positioned in the water circulation channel to rotatably support the impeller assembly.

In another embodiment of this invention, each pump unit is provided with some hubs centrally mounted inside of and secured to the housing. The hub is positioned either upstream or downstream from the impeller, relative to the direction of water flow, such that water passing from the inlet end to the outlet end of the housing must pass by the hub. The hub may rotatably support a portion of the impeller assembly. The hub may be secured to the housing by one or more flow straightening vanes, pre-swirl vanes or struts.

The impeller assembly preferably includes a generally hollow shaft rotatably mounted in the hub. The shaft has an opening into the hollow portion on the intake side of the impeller. A second aft end of the suction shroud forms a hub gap relative to the hub and on the outlet side of the impeller. The hub gap and the opening in the shaft are preferably in communication with one another to form a second water circulation channel between the hub and the tubular suction shroud. Water cooled, hard surface radial bearings are mounted on the hub and tubular suction shroud and positioned in the second water circulation channel. The bearings rotatably support the tubular suction shroud. Hard surface, water cooled thrust bearings may be mounted on the impeller assembly and one of the hub or the housing. A separate water circulation pump may be provided to supply cooling and lubricating water to the bearings.

The housing of each pump unit of this invention may also include a water cooling jacket around the stator. The water jacket is preferably in communication with the water flowing through the housing such that water will flow through the cooling jacket to cool the stator during operation. Alternatively, a separate source of clean cooling water may be provided for circulation through the cooling jacket.

The multi-stage, in-line configuration permits lower impeller vane tip speed than may be obtained in conventional pumps operating at the same pressure and flow rate. Lower vane tip speed greatly reduces cavitation and the associated noise. The configuration also provides redundancy and an expanded range of operating modes. It also reduces weight and size associated with conventional pump casings and eliminates the need for shaft seals where the impeller drive shaft enters the pipe line.

This invention will be more fully understood from the following detailed description of preferred embodiments on reference to the appended drawings.

DESCRIPTION OF PREFERRED EMBODIMENTS

Figure 1:
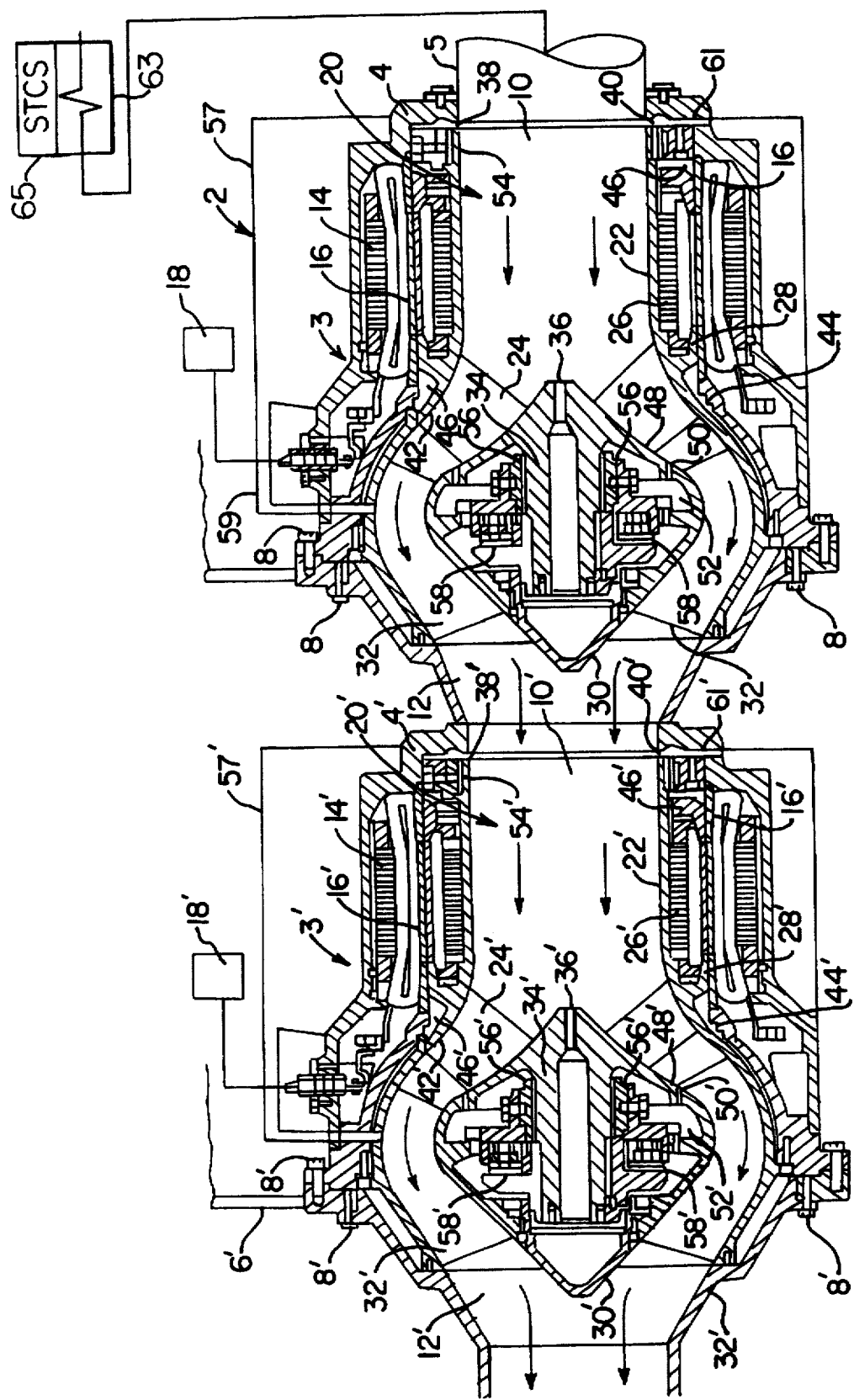
FIG. 1 is a longitudinal sectional view of one embodiment of the pump of this invention.
Figure 2:
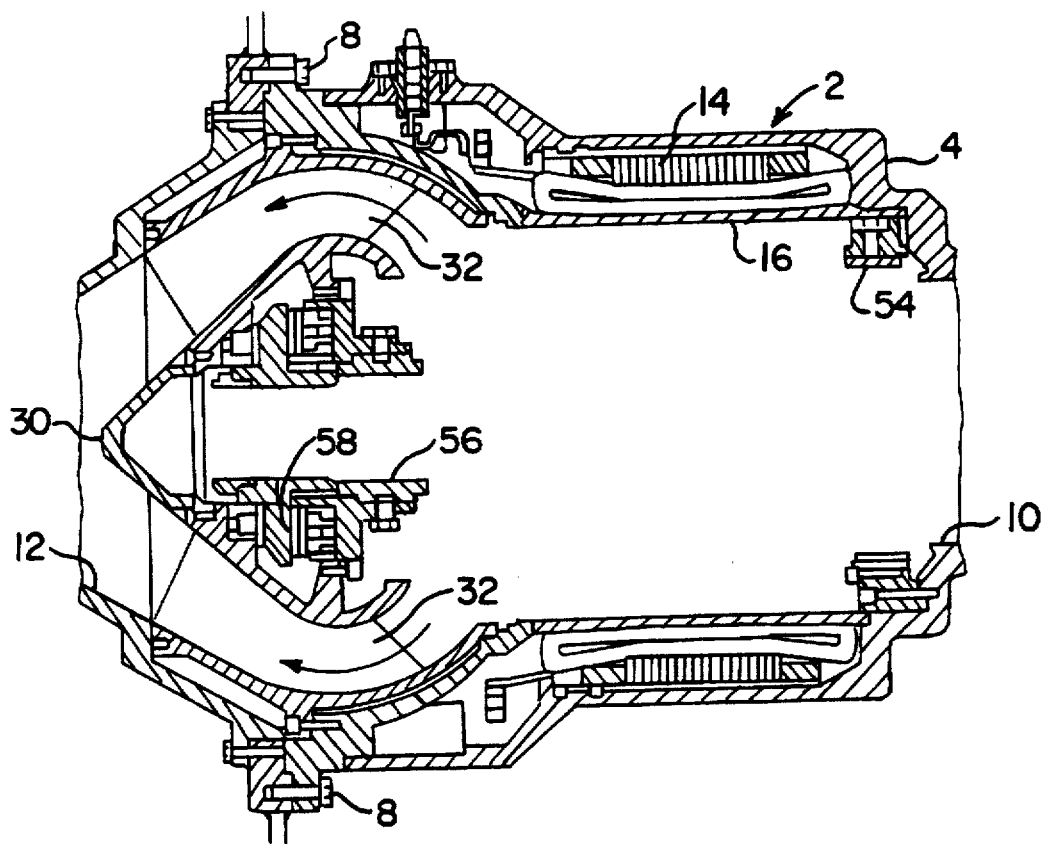
FIG. 2 is a longitudinal sectional view of the housing and hub of one pump unit of the pump of FIG. 1.
Figure 3:
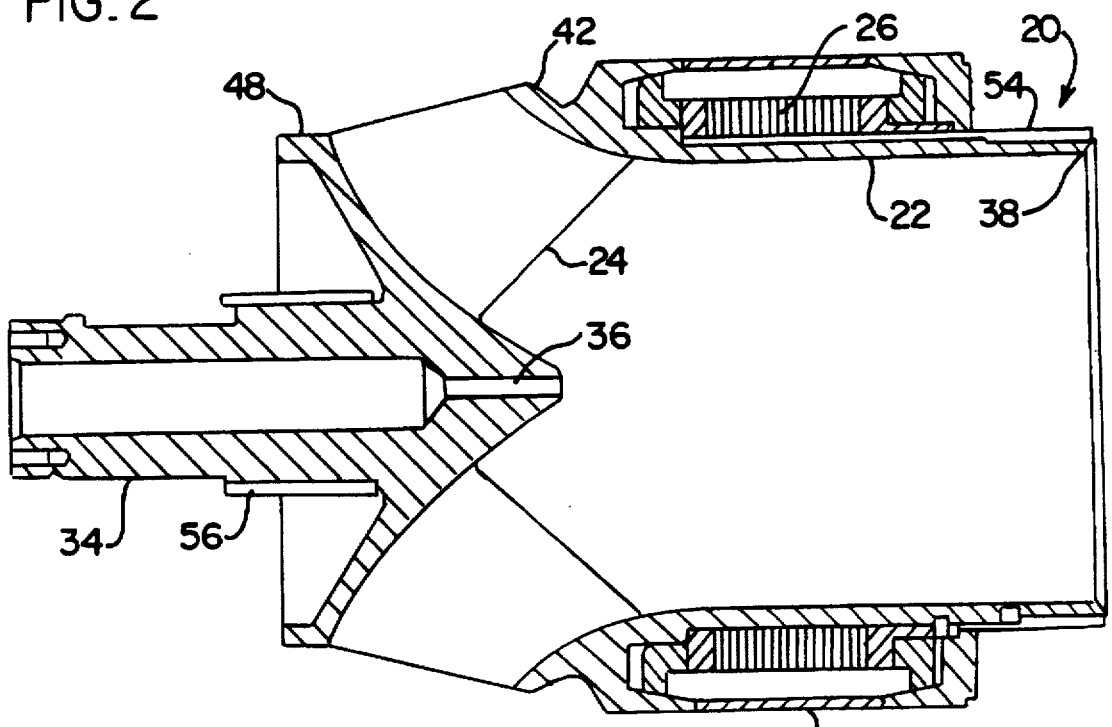
FIG. 3 is a longitudinal sectional view of the impeller assembly of one pump unit of the pump of FIG. 1.

Referring to FIGS. 1 through 3, there is shown a preferred embodiment of the pump 2 of this invention. Pump 2 includes two generally identical pump units 3, 3' connected in series in a pipeline 5. For simplicity of description, reference will be made to only one of the pump units 3 in describing the components of the pump unit. The other pump unit 3' is identical to pump unit 3. Each pump unit 3 includes a generally hollow housing 4 secured in the pipeline. Housing 4 has an inlet end 10 and an outlet end 12. An annular stator 14 is mounted inside housing 4. As may best be seen in FIG. 2, annular stator 14 is hermetically sealed inside housing 4 by stator can 16. Energizing means 18 provide electrical power to stator 16 (FIG. 1). Energizing means 18 preferably include a generator, or other source of electrical power, electrically connected to stator 14. The generator may be positioned in a location in the vessel that is remote from pump 2 since only electrical connections to the pump units, rather than mechanical connections, are required.

Each pump unit of pump 2 further comprises an impeller assembly 20. Impeller assembly 20 includes a tubular suction shroud 22 extending through and rotatable relative to annular stator 14. An impeller 24 is secured to suction shroud 22. The vanes of impeller 24 may be secured to suction shroud 22 by welding or any other suitable manner known to those skilled in the art. The number of blades on impeller 24 and the blade configuration will depend on the desired performance of the pump and may be determined in a manner known to those skilled in the art. In a preferred embodiment, impeller 24 is a single stage, mixed flow type impeller. It will be apparent, however, that an impeller having one or more centrifugal, axial or mixed flow type stages may be utilized. A rotor 26 is mounted around tubular suction shroud 22 and inside stator 14. Rotor 26 and stator 14 preferably cooperate to form an induction motor. Rotor 26 is preferably a squirrel cage rotor so that no electrical connections to the rotor are required. It will be appreciated, however, that the motor could be a synchronous motor. Rotor 26 is preferably shrink fitted onto suction shroud 22. Rotor 26 is preferably hermetically sealed by rotor can 28. Energizing stator 14 causes rotor 26 to rotate, thereby rotating suction shroud 22 and impeller 24 to create a pressurized flow of water through the housing 4 from inlet end 10 to outlet end 12. The pumping action of the rotation of impeller 24 adds head and velocity to the water, which causes the water pressure to be higher on the outlet side of the impeller than on the inlet side thereof.

In a preferred embodiment, hub 30 is centrally positioned and secured to housing 24 adjacent to outlet end 12. Hub 30 is preferably secured to housing 4 by seven flow straightening vanes 32. However, it will be appreciated that any suitable number of straightening vanes 32 may be used. The desired number of straightening vanes provided may be determined in a manner known to those skilled in the art. Alternatively, hub 30 may be secured to housing 4 by a plurality of struts which have little affect on the water flow. A combination of struts and vanes may also be used. Water flows around hub 30 from inlet end 10 to outlet end 12. The straightening vanes 32 reduce the magnitude of the circular component of motion of the flowing water which is produced by the action of rotating impeller 24.

Impeller assembly 20 preferably includes a generally hollow shaft 34. Shaft 34 has an opening 36 into the central hollow portion thereof. Opening 36 is on the inlet side of impeller 24. Shaft 34 is received into hub 30, thereby rotatably supporting impeller assembly 20.

Tubular suction shroud 22 has a forward end 38 that forms a forward gap 40 relative to housing 4 on the inlet side of impeller 24. Forward gap 40 is adjacent to the inlet end 10 of housing 4 on the inlet side of impeller 24. Tubular suction shroud 22 also has a first aft end 42 forming an aft gap 44 relative to housing 4. Aft gap 44 is on the outlet side of impeller 24. Forward gap 40 and aft gap 44 are preferably in communication with one another, thereby forming a first water circulation channel 46 between rotor 26 and housing 4. During operation, water flowing through housing 4 enters aft gap 44, where the pressure is higher, flows through first water circulation channel 46 and exits through forward gap 40 into the water flowing through housing 4. The water flowing through first water circulation channel 40 cools stator 14 and rotor 26.

Tubular suction shroud 22 preferably also has a second aft end 48 forming a hub gap 50 relative to hub 30 and on the outlet side of impeller 24. Hub gap 50 and opening 36 in shaft 34 are in communication with one another thereby forming a second water circulation channel 52 between hub 30 and tubular suction shroud 22. Water enters hub gap 50, flows through second water circulation channel 52 and exits through opening 36 in shaft 34.

First radial bearings 54 are mounted between housing 4 and suction shroud 22 to rotatably support one end of suction shroud 22. First bearings 54 are preferably one or more hard surface, water cooled pivoted pad or plain journal bearings mounted around the circumference of housing 4 and tubular suction shroud 22. Bearings 54 are preferably in communication with first water circulation channel 46. Water flowing in first water circulation channel 46 also cools and lubricates the bearings. The pads of the bearings of first radial bearings 54 are preferably made of a hard alloy material, such as tungsten carbide, or other suitable material that will not be damaged by sand and other material that may be present in the flowing water.

Second radial bearings 56 are mounted between impeller assembly 20 and hub 30 to rotatably support another end of suction shroud 22. Second radial bearings 56 preferably include one or more hard surface, water-cooled, pivoted pad or plain journal bearings mounted around the circumference of shaft 34 in second water circulation channel 52. Water flowing in second water circulation channel 52 flows over the bearings to cool and lubricate them. The pads of second radial bearings 56 are preferably made of a hard alloy material, such as tungsten carbide, or other suitable material, to minimize the likelihood of damage resulting from sand or other contaminants in the flowing water.

Thrust bearings 58 are preferably mounted between impeller assembly 20 and hub 30. Thrust bearings 58 preferably consist of double acting, water-cooled, self-leveling Kingsbury-type bearings. Thrust bearings 58 are mounted in second water circulation channel 52. Water flowing in second water circulation channel 52 cools and lubricates thrust bearings 58. The pads and thrust runner surfaces of thrust bearings 58 are preferably made of the same materials as the pads of the radial bearings to minimize damage from contaminants in the water flow.

Housing 4 may be provided with a cooling jacket around annular stator 14. Cooling jacket 57 includes water inlet means 59 in communication with the water flowing through housing 4 and located adjacent to outlet end 12. Cooling jacket 57 also includes water outlet means 61 in communication with the water flowing through housing 4 and adjacent to inlet end 10. Water enters the cooling jacket through water inlet means 59, circulates through water cooling jacket 57 and is discharged back into the flow of water in housing 4 through water outlet means 61. The water flowing in cooling jacket 57 provides additional cooling for stator 14 if necessary.

In operation, energization of stator 14 causes rotor 26 to rotate. Rotation of rotor 26 also rotates impeller assembly 20, which creates a pumping action. Water, sea water or fresh water, is pumped from the water in which the vessel is floating through inlet conduit 60. The rotating impeller 24 imparts velocity to the water and adds head to the water flow, thereby pressurizing the water. The higher pressure water is discharged out outlet end 12 to flow through the pipeline 5 and into the next pump unit 3'. Pump units 3, 3' may be positioned within pipeline 5 in virtually any desired configuration. The pump units may be positioned immediately adjacent to one another so that discharge from pump unit 3 initially flows into the inlet end 10 of pump unit 3'.

Alternatively, the pump units may be spaced from one another. In addition, the pump units may be positioned in a horizontal section of pipeline, in a vertical section of pipeline, in portions of the pipeline offset by an elbow, or in any desired location in the pipeline.

In a preferred embodiment, two pump units are provided. However, it will be appreciated that any desired number of pump units may be provided to achieve the desired performance.

The use of two pump units permits the pump units to operate at lower rpm, and, thus, lower impeller blade tip speeds thereby reducing cavitation noise. The lower rpm also produce less acoustical mechanical noise and requires less power to operate. The pump units may be operated independently, at the same or different speeds to produce the desired performance. In addition, the multi-stage configuration provides redundancy for continued operation of the system in the event of a failure of one pump unit.

It will be appreciated that this invention provides a multi-stage in-line pump which is quieter and more flexible than conventional installations and which also eliminates the need for a drive shaft to be mechanically connected to the impeller and mounted in the pipeline. In one application of the invention, the pump 2 such as formed by the pumps 3 and 3', draw water through the secondary side 63 of a steam turbine condenser system (STSC) 65 of a marine vessel through the pipe 5, as indicated in FIG. 1.

Whereas particular embodiments of this invention have been described for purposes of illustration, it will be evident to those skilled in the art that numerous variations of the details may be made without departing from the invention as described in the appended claims.

What is claimed is:

1. A multi-stage pump comprising:

at least two pump units each powered by a canned electric motor and connected in series in a flow path, each said pump unit including a generally hollow housing secured in said flow path, said housing having an inlet end and an outlet end, an annular stator mounted inside said housing, energizing means for supplying electrical power to said annular stator, an impeller assembly including a tubular suction shroud extending through and rotatable relative to said annular stator, an impeller secured to said tubular suction shroud, said tubular suction shroud having a forward end forming a forward gap relative to said housing positioned upstream of said impeller with respect to the flow of water, and an aft end forming an aft gap relative to said housing positioned downstream of said impeller in said flow path, said forward gap and said aft gap being in communication with one another forming a water circulation channel between said rotor and said housing, at least one bearing means mounted on said housing and positioned in said water circulation channel for rotatably supporting said impeller assembly, and an annular rotor mounted around said tubular suction shroud and inside said annular stator, said rotor rotating said tubular suction shroud and impeller to create a pressurized water flow through said housing from said inlet end to said outlet end, said impeller assembly of each pump unit being unconnected mechanically to an impeller assembly of another of said pump units.

2. The multi-stage pump of claim 1, wherein two pump units are provided.

3. The multi-stage pump of claim 1, wherein said bearing means is a water cooled, hard surface bearing.

4. A multi-stage pump comprising:

at least two pump units each powered by a canned electric motor and connected in series in a flow path, each said pump unit including a generally hollow housing secured in said flow path, said housing having an inlet end and an outlet end, an annular stator mounted inside said housing, energizing means for supplying electrical power to said annular stator, an impeller assembly including a tubular suction shroud extending through and rotatable relative to said annular stator, an impeller secured to said tubular suction shroud, and an annular rotor mounted around said tubular suction shroud and inside said annular stator, said rotor rotating said tubular suction shroud and impeller to create a pressurized water flow through said housing from said inlet end to said outlet end, each said housing including a water cooling jacket around said stator, said water cooling jacket being in communication with the water flowing through said housing, whereby water will flow through said water cooling jacket to cool said stator, and said impeller assembly of each pump unit being unconnected mechanically to an impeller assembly of another of said pump units.

5. A multi-stage seawater pump for supplying cooling water flow to the secondary side of a steam turbine condenser system of a marine vessel, said pump comprising:

at least two pump units each powered by a canned electric motor and connected in series in a flow path, each said pump unit including a generally hollow housing secured in said flow path, said housing having an inlet end and an outlet end, an annular stator mounted inside said housing, energizing means for supplying electrical power to said annular stator, an impeller assembly including a tubular suction shroud extending through and rotatable relative to said annular stator, an impeller secured to said tubular suction shroud, a hub positioned downstream of said impeller with respect to the water flow, and an annular rotor mounted around said tubular suction shroud and inside said annular stator, said rotor rotating said tubular suction shroud and impeller to create a pressurized water flow through said housing from said inlet end to said outlet end, said tubular suction shroud having a forward end forming a forward gap relative to said housing positioned upstream of the impeller with respect to the water flow, and an aft end forming an aft gap relative to said housing positioned downstream of the impeller with respect to the water flow, said forward gap and said aft gap being in communication with one another to form a water circulation channel between said rotor and said housing, said impeller assembly including a generally hollow shaft rotatably mounted within said hub, said shaft having an opening into the hollow thereof positioned upstream from said impeller with respect to the water flow, said tubular suction shroud having a second aft end forming a hub gap relative to said hub positioned downstream from said impeller with respect to the water flow, adjacent said outlet end of said housing, said hub gap and said opening in said shaft being in communication with one another to form a second water circulation channel between said hub and said tubular suction shroud and, said impeller assembly of each pump unit being unconnected mechanically to an impeller assembly of another of said pump units.

6. The main seawater pump of claim 5, wherein two pump units are provided.

7. The main seawater pump of claim 5, wherein first radial bearing means are mounted between said housing and said suction shroud for rotatably supporting one end of said impeller assembly;

second radial bearing means are mounted between said impeller assembly and said hub for rotatably supporting another end of said impeller assembly; and thrust bearing means are mounted between said impeller assembly and said hub to rotatably support said impeller assembly.

8. The main seawater pump of claim 5, wherein said hub is secured to said housing by at least one vane.

9. The main seawater pump of claim 5, wherein said inlet end is connected to an inlet conduit for supplying water thereto.

10. The main seawater pump of claim 9, wherein said outlet end is connected to a straight discharge conduit.

11. The main seawater pump of claim 5, wherein each said housing includes a water cooling jacket around said stator, said water jacket being in communication with the water flowing through said housing, whereby water will flow through said housing to cool said stator.

* * * * *

(12) EX PARTE REEXAMINATION CERTIFICATE (5618th)
United States Patent
Veronesi et al.

(10) Number: US 5,713,727 C1
(45) Certificate Issued: Nov. 28, 2006

(54) MULTI-STAGE PUMP POWERED BY INTEGRAL CANNED MOTORS

(75) Inventors: Luciano Veronesi, Pittsburgh, PA (US); Allen L. Morris, Allison Park, PA (US)

(73) Assignee: Curtiss-Wright Electro-Mechanical Corporation, Cheswick, PA (US)

Reexamination Request:
No. 90/007,161, Aug. 5, 2004

Reexamination Certificate for:
Patent No.: 5,713,727
Issued: Feb. 3, 1998
Appl. No.: 08/383,345
Filed: Feb. 3, 1995

Related U.S. Application Data

(63) Continuation-in-part of application No. 08/164,892, filed on Dec. 9, 1993, now Pat. No. 5,490,768.

(51) Int. Cl.
*H02K 16/00* (2006.01)
*F04B 35/04* (2006.01)

(52) U.S. Cl. .................. 417/356; 417/357; 417/366; 417/423.5; 417/423.8; 440/30

(58) Field of Classification Search .................. None
See application file for complete search history.

(56) References Cited

U.S. PATENT DOCUMENTS

| | | |
|---|---|---|
| 1,387,416 A | 8/1921 | Lemieux |
| 1,996,195 A | 4/1935 | Ferguson |
| 2,197,432 A | 4/1940 | Kingsbury |
| 2,656,809 A | 10/1953 | Frasure |
| 2,997,015 A | 8/1961 | Richter |
| 3,143,972 A | 8/1964 | Smith et al. |
| 3,398,996 A | 8/1968 | Wucherer |
| 3,482,402 A | 12/1969 | Anthoney |
| 3,708,251 A | 1/1973 | Pierro |
| 4,360,751 A | 11/1982 | Arnold, Jr. et al. |
| 4,389,197 A | 6/1983 | Ballantine |
| 4,429,924 A | 2/1984 | Frantz et al. |

(Continued)

FOREIGN PATENT DOCUMENTS

| | | |
|---|---|---|
| CA | 643644 | 6/1962 |
| DE | 688114 | 1/1940 |
| EP | 0 452 538 A1 | 10/1991 |
| FR | 2 336 297 | 7/1977 |
| GB | 1 439 806 | 6/1976 |
| JP | 0006892 | 1/1987 |
| JP | 235295 | 2/1990 |
| JP | 626891 | 2/1994 |
| NO | 166577 | 5/1991 |

OTHER PUBLICATIONS

Pump Handbook (3rd Edition), McGraw–Hill□□Section 2.2.7.2, Canned Motor Pumps, pp. 2.315–2.326□□Karassik, Igor J.; Messina, Joseph P.; Cooper, Paul; Heald, Charles C. (2001). □□.*

Brochure of Jastram–Werke GmbH KG entitled "Jastram Forschung —From the Idea to the Marketable Product" dated Aug. 1988.

Waukesha Bearings Public. No. TPF–100 "Tilting Pad Thrust Bearing Selective Guide" (undated).

*Primary Examiner*—Kenneth Bomberg

(57) ABSTRACT

An in-line, multi-stage pump powered by integral canned electric motors. At least two pumps units are connected in series in a pipeline. Each of said pump units includes a hollow housing having a hermetically sealed stator mounted therein. The stator is electrically connected to a source of electrical energy. An impeller assembly that includes a tubular suction shroud and impeller is rotatably mounted inside the housing. The impeller assembly includes a hermetically sealed rotor which is mounted around the suction shroud and positioned inside the stator in operative association therewith. Energizing the stator rotates the rotor, which in turn rotates the impeller to pump fluid from the intake end of the housing to the outlet end of the housing. The subsequent pump units add pressure and/or maintains the pressure of the pumped fluid.

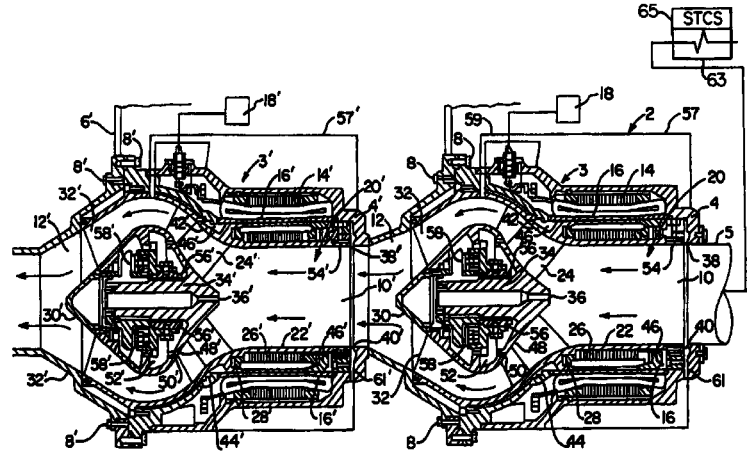

U.S. PATENT DOCUMENTS

| | | | |
|---|---|---|---|
| 4,459,087 A | 7/1984 | Barge | |
| 4,474,561 A * | 10/1984 | Haglund | 440/41 |
| 4,496,862 A | 1/1985 | Weber | |
| 4,544,285 A | 10/1985 | Shapiro et al. | |
| 4,575,315 A | 3/1986 | Galais et al. | |
| 4,657,411 A | 4/1987 | Bath | |
| 4,710,111 A | 12/1987 | Kubo | |
| 4,831,297 A | 5/1989 | Taylor et al. | |
| 4,876,492 A | 10/1989 | Lester et al. | |
| 4,886,430 A | 12/1989 | Veronesi et al. | |
| 4,990,068 A * | 2/1991 | Zhong et al. | 417/423.8 |
| 5,108,323 A | 4/1992 | Veronesi et al. | |
| 5,165,305 A | 11/1992 | Veronesi | |
| 5,171,514 A | 12/1992 | Veronesi et al. | |
| 5,181,868 A | 1/1993 | Gabriel | |
| 5,185,545 A | 2/1993 | Veronesi et al. | |
| 5,205,653 A | 4/1993 | Veronesi et al. | |
| 5,220,231 A | 6/1993 | Veronesi et al. | |
| 5,252,875 A | 10/1993 | Veronesi et al. | |
| 5,257,952 A | 11/1993 | Veronesi et al. | |
| 5,289,068 A | 2/1994 | Veronesi et al. | |
| 5,291,087 A | 3/1994 | Pollick et al. | |
| 5,336,064 A | 8/1994 | Lamers | |
| 5,408,155 A | 4/1995 | Dickinson et al. | |
| 6,759,774 B1 * | 7/2004 | Griggs | 310/87 |

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–11 is confirmed.

\* \* \* \* \*